United States Patent [11] 3,623,105

[72] Inventors Ira Kamen
New York;
Joseph H. Vogelman, Roslyn, both of N.Y.
[21] Appl. No. 31,672
[22] Filed Apr. 24, 1970
[45] Patented Nov. 23, 1971
[73] Assignee Laser Link Corporation
New York, N.Y.

[54] FILTERED PULSE WIDTH MODULATION COMMUNICATION SYSTEM
10 Claims, 10 Drawing Figs.

[52] U.S. Cl. 343/203, 325/40, 325/47, 325/139, 325/142, 179/15 BM
[51] Int. Cl. H04b 1/04, H04b 1/16
[50] Field of Search 325/40, 47, 48, 49, 50, 61, 139, 142; 343/200, 201, 207, 203, 208; 179/15 FD, 15 FS, 15 BM

[56] References Cited
UNITED STATES PATENTS

| | | | |
|---|---|---|---|
| 2,583,484 | 1/1952 | Guanella | 179/15 |
| 3,337,687 | 8/1967 | Normand | 178/53.1 |

*Primary Examiner*—Robert L. Griffin
*Assistant Examiner*—Kenneth W. Weinstein
*Attorney*—Sandoe, Hopgood and Calimafde

ABSTRACT: A communications system provides a practical means for transmitting a plurality of input information signals, such as television signals, over a single transmitter. The signals are combined or multiplexed to form a composite signal which serves to modulate an initial carrier signal. That modulated signal in turn pulse modulates a transmitter carrier to produce a pulse width modulated signal that contains all the essential information of the input signals.

INVENTORS
IRA KAMEN
JOSEPH H. VOGELMAN
BY
Sandoe, Hopgood & Calimafde
ATTORNEYS

INVENTORS
IRA KAMEN
JOSEPH H. VOGELMAN
BY
Sandoe, Hopgood & Calimafde
ATTORNEYS

INVENTORS
IRA KAMEN
JOSEPH H. VOGELMAN
BY
Sandoe, Hopgood & Calimafde
ATTORNEYS

INVENTORS
IRA KAMEN
JOSEPH H. VOGELMAN
BY
Sandoe, Hopgood & Calimafde
ATTORNEYS

FILTERED PULSE WIDTH MODULATION COMMUNICATION SYSTEM

The present invention relates generally to communication systems, and particularly to a communication system of the type for transmitting a plurality of information signals.

Recent developments in the television industry have greatly expanded the possible uses for the utilization of the television medium. Television, for example, is presently being extensively used in educational facilities to bring subject matter directly into the classrooms in a manner which was heretofore impractical or impossible, thereby significantly expanding the teaching potential of the nation's schools.

In a further effort to more fully utilize the great potential of the television medium CATV systems have been developed to bring television into areas that were previously outside the range of commercially broadcast signals. Moreover, other systems such as cable television and pay television are available in many communities to further increase the scope of information and entertainment that are made available to the viewing public.

In these television systems, a plurality of video signals are transmitted between a transmitting station and the television receiver. In many systems such as CATV installations, it is necessary to periodically relay and amplify the transmitted signals to ensure sufficient signal amplitude and signal-to-noise ratio at the receiver.

In the known systems, the transmission and relaying of multiple television channels requires the use of multiple transmitters which significantly increases the complexity and cost of these systems. Moreover, the known multichannel transmission systems commonly utilize amplitude modulation techniques which require extreme system linearity and lack noise immunity. These systems therefore require the use of high power transmitting equipment to obtain moderate power outputs and wider frequency separation between systems. The latter requirement results in an inefficient use of the already crowded broadcasting frequency spectrum. In addition, in amplitude modulated systems it is necessary to operate the RF amplifiers in the linear regions to preserve signal fidelity and minimize intermodulation and cross-modulation when multiple signals are present. This factor further reduces the efficiency of the transmitter since the output amplifier stage must often be operated well below its maximum capability. Such modulation systems are also inefficient at frequencies above 10GHz. in which attenuation of the transmitted signals as a result of rainfall, or the like, presents serious problems with respect to noise and interference.

The known multichannel transmission systems present further areas of difficulty and inefficiency including their susceptibility to adverse atmospheric conditions such as ambient noise, rain, snow and fog, and their inability to transmit television channels at other than a fixed bandwidth, e.g. 6MHz. As a result of the latter limitation, the known multichannel systems are not readily adaptable to special applications such as fasimile, educational and commercial signal transmission.

It is thus an object of the present invention to provide a communications system in which multichannel signals can be transmitted by a single transmitter.

It is a further object of the present invention to provide a communications system in which improved signal-to-noise-ratios are provided without sacrificing bandwidth.

It is another object of the present invention to provide a multichannel communications system which is less susceptible to adverse atmospheric conditions as compared to comparable prior art systems.

It is a general object of the present invention to provide a multichannel television transmission system which offers greater simplicity of equipment and reduced costs along with increased power capabilities and flexibility of channel frequency allocation, as compared to the comparable prior art systems.

To these ends the communications system of the present invention contemplates the formation of a single composite modulating signal obtained by combining or multiplexing a plurality of input information (e.g., video) signals. The composite signal is applied to the control terminal of a tunable high-frequency oscillator whose instantaneous frequency is determined by the amplitude of the composite modulating signal. The oscillator output is then applied to a modulator, which may be a pulse-width modulator to modulate the system carrier, and thereby produce the transmitted signal containing all relevant information of the input signals. If desired, suitable filters may be introduced in the system to suppress either a sideband and/or the carrier of the modulator output to satisfy particular system and receiver requirements.

To the accomplishment of the above and to such further objects as may hereinafter appear, the present invention relates to a filtered pulse width modulation communication system substantially as defined in the appended claims, and as described in the following specification taken together with the accompanying drawings in which:

FIG. 1 is a schematic block diagram of a transmitter for transmitting a plurality of information signals according to one embodiment of the invention;

FIGS. 2*a*–2*d* are waveforms and frequency spectra of signals utilized in the transmitter of FIG. 1;

Figure 5A:
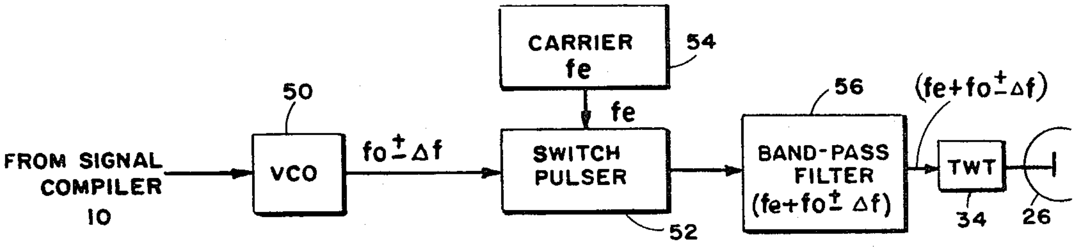
Figure 5B:
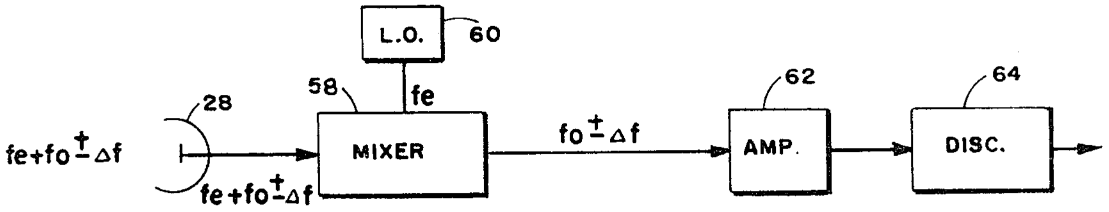
Figure 6A:
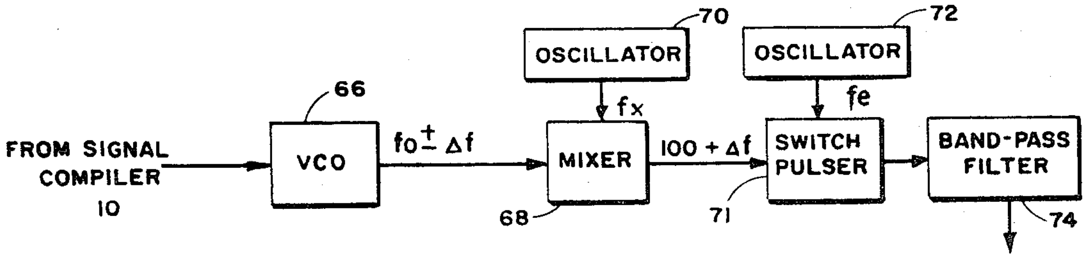
Figure 6B:
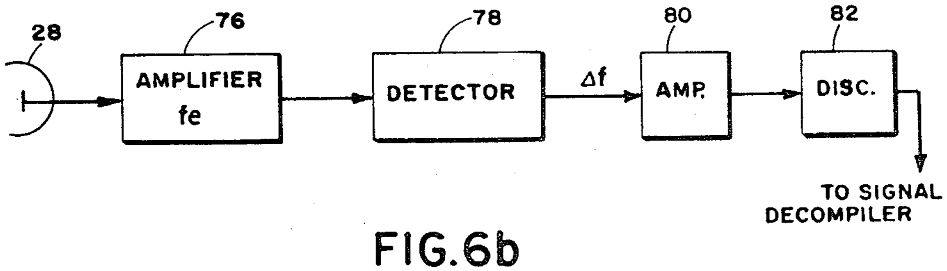
Figures 7, 8:
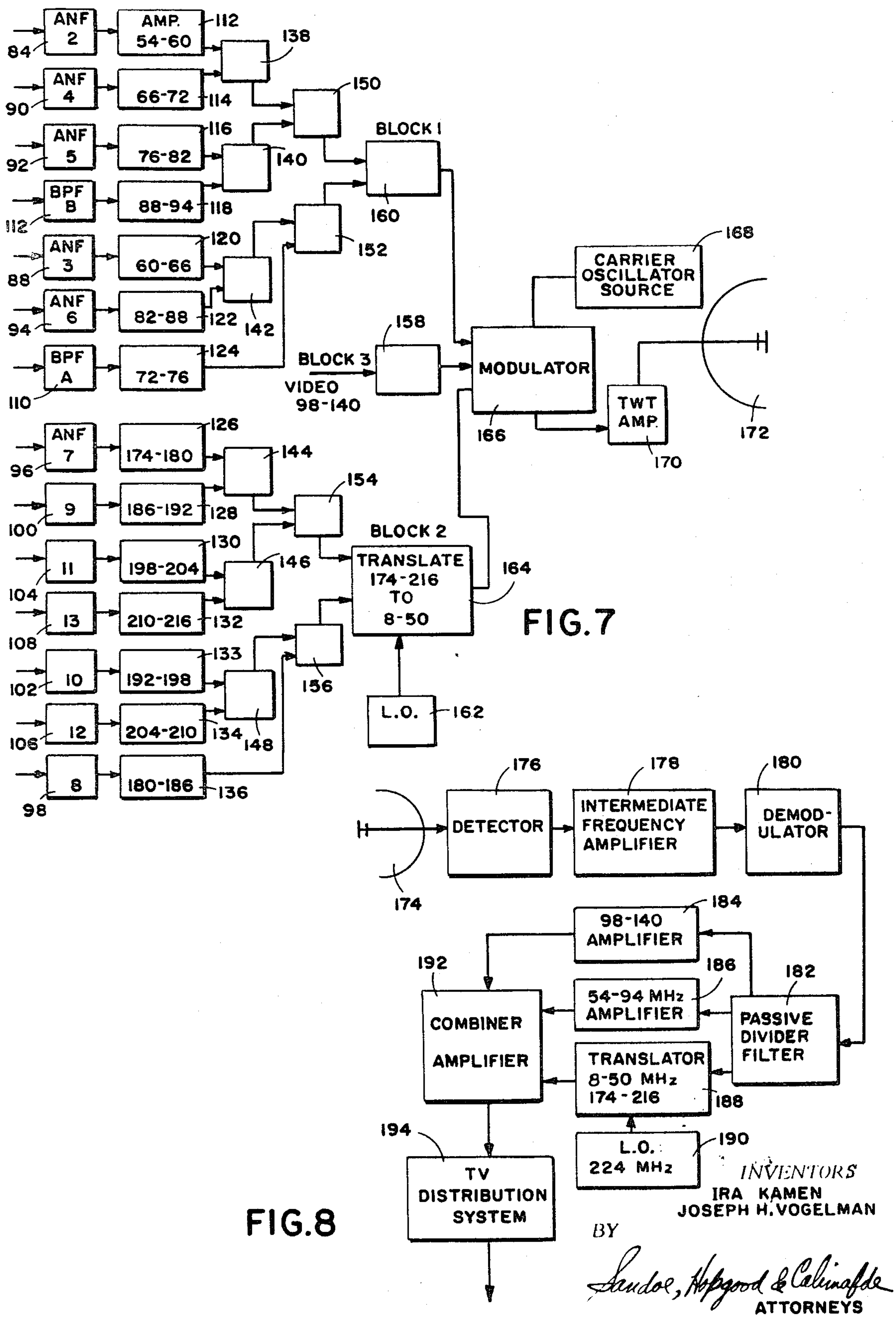

FIG. 5*a* and 5*b* are, respectively, schematic block diagrams of a transmitter and a receiver according to a further embodiment of the invention;

FIGS. 6*a* and 6*b* are schematic block diagrams similar to FIGS. 5*a* and 5*b* of another embodiment of the invention;

FIG. 7 is a more detailed schematic block diagram of a multichannel television transmitter; and FIG. 8 is a schematic block diagram of a receiver for use with the transmitter of FIG. 7.

The communications system of the present invention receives a plurality of information signals such as video signals. Those signals may either be in the form of a plurality of modulated carriers at different frequencies, or as video signals obtained directly from sources of such signals as from a television camera or the like. The information signals are compiled to form a composite modulating signal which includes all the relevant information for those signals. The composite signal is then employed to modulate a transmitter carrier to produce a single modulated carrier signal which is transmitted to the receiver. The system of this invention thus has the capability of transmitting a plurality of information signals, such as video signals, by means of a single transmitted modulated carrier signal.

Figure 1:
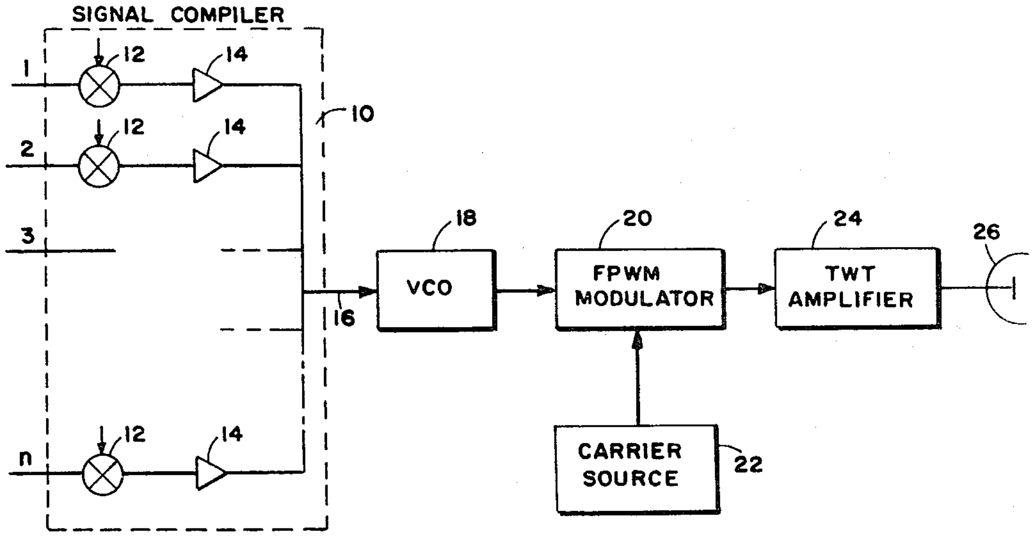
Figure 2:
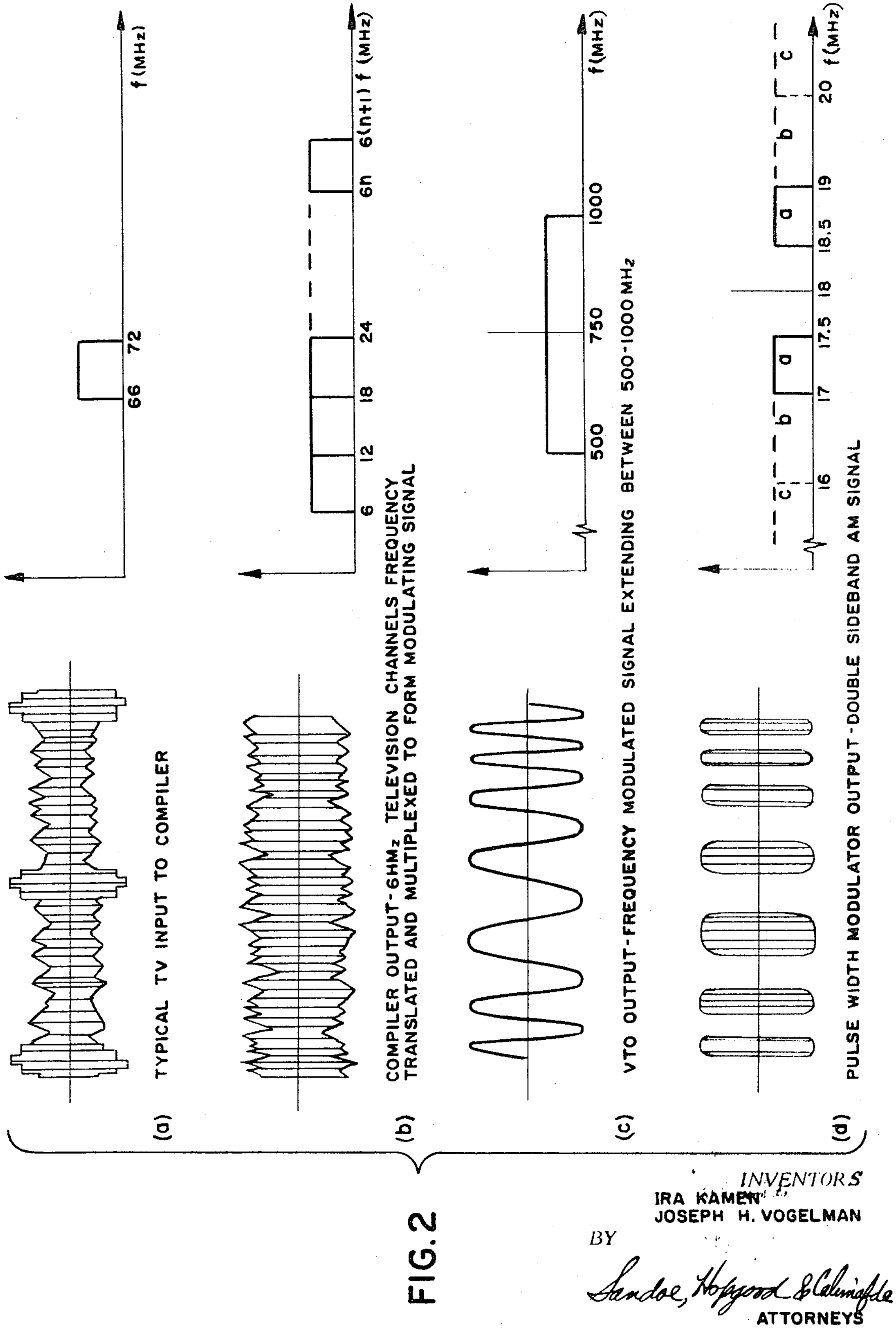

FIG. 1 illustrates a basic embodiment of the invention in which a total of *n* input video signals 1–*n* are applied as inputs to a signal compiler 10. A typical input video signal along with its frequency spectrum is illustrated in FIG. 2*a*. Signal compiler 10 may, as herein shown, include frequency translators or mixers 12 which translate the input signals into preselected subband channels. The output of each of the frequency translators is applied to an amplifier 14, the gains of which are respectively selected to establish substantially equal output levels for each of the translated input video signals. The outputs of amplifiers 14 are summed in any manner known, thereby to form from the input signals of signal compiler 10, a single composite signal which appears at a line 16 at the output of signal compiler 10.

The subband channels produced in signal compiler 10 may advantageously start at a lowest carrier of 6MHz. and may be spaced from each other by 6MHz. Thus, for a 10-channel TV system, the modulation composite video signal produced at signal compiler 10 occupies the frequency range between 6–66MHz. FIG. 2*b* illustrates a typical output signal of the signal compiler 10 at line 16.

The output of signal compiler 10 is applied to the frequency control terminal of a variable oscillator here shown as a voltage tuned oscillator 18 having a nominal frequency of 750 MHz. Oscillator 18 is a high-frequency oscillator which produces an output signal whose instantaneous frequency is determined by the instantaneous level of the voltage applied to its frequency control terminal, that is, the instantaneous level of the composite signal derived from the output of signal compiler 10. Ideally, the voltage-frequency characteristics of oscillator 18 are of the type such that a change in the level of the control signal, to wit, the composite video signal, causes a proportional variation of the nominal or center frequency of the oscillator.

Within the frequency deviation region in which the linear relationship between frequency and voltage as noted above applies, the output frequency of oscillator 18 will closely follow the output voltage variations of the composite video signal produced by signal compiler 10. A typical output signal of oscillator 18 in response to the input composite video signal shown in FIG. 2*b* is illustrated in FIG. 2*c*. The calculation of the exact frequency spectrum produced by oscillator 18 is extremely difficult because of the random nature of the input video signals applied to each channel of signal compiler 10. However, by applying Carson's rule for frequency modulation, an accurate estimate of the total required bandwidth can be obtained. Carson's rule states that the bandwidth required for the transmission of an FM signal is equal to twice the frequency deviation plus twice the highest modulating frequency. Assuming a nominal or quiescent frequency of 750 MHz. for oscillator 18, and an overall bandwidth of 500MHz. for a typical 10-channel video system, the maximum deviation will be $\Delta f = BW/2 - fm_{max} = 184$MHz., and the modulation index is thus 184/66 or approximately 3.

The frequency modulator output of oscillator 18 (FIG. 2*c*) is applied to the input of a pulse width modulator 20 which also receives a high-frequency (e.g., 18GHz.) signal from a carrier source 22 which produces the transmitter carrier frequency. Modulator 20 may be conveniently of the type described in copending application Ser. No. 694,266 entitled "Wide Band Microwave Modulator" in the name of Harold R. Walker and assigned to the assignee of the present application, and will thus be described here in only relatively brief terms.

Modulator 20 operates to "key," that is, switch on and off, the carrier signal obtained from carrier source 22 in response to the frequency modulated signal of oscillator 18 (FIG. 2*c*). The results of this keying operation in modulator 20 is a train of 18GHz. waves (FIG. 2*d*) which are pulse width modulated, the pulse width modulation being accomplished in response to the changing period of the FM modulating signal.

The spectrum of the pulse-width modulated signal which results from this modulating process is a signal including the carrier at 18GHz. and a pair of first sidebands a extending from 18.5 to 19.0 GHz. and 17.0 to 17.5 GHz. The spectrum also includes higher ordered sidebands *b*, *c*, which are harmonics of the first sidebands and are also a result of the pulse width modulation process. All of the necessary information obtained in the modulating signal which produces the pulse width modulation is contained in either the upper or lower first side bands which are substantially exact replicas of the modulating spectrum, so that it is required to only transmit one of these sidebands as will be described below with reference to other embodiments of the invention.

The output of modulator 20, that is, the pulse width modulated signal at the 18GHz. carrier frequency, is applied to the input of an amplifier which is here shown as a traveling wave tube (TWT) amplifier 24 which amplifies the pulse width modulated signal and filters out redundant or unnecessary modulation products while still retaining the essential information contained in the input video signals to insure a faithful reproduction of those signals at the transmitter output. The output of TWT amplifier 24 is applied to a transmitting antenna 26 for transmission to a remote receiver. The transmitted signal thus contains all the relevant information of the plurality of input video signals on a single transmitted carrier.

Figure 3:
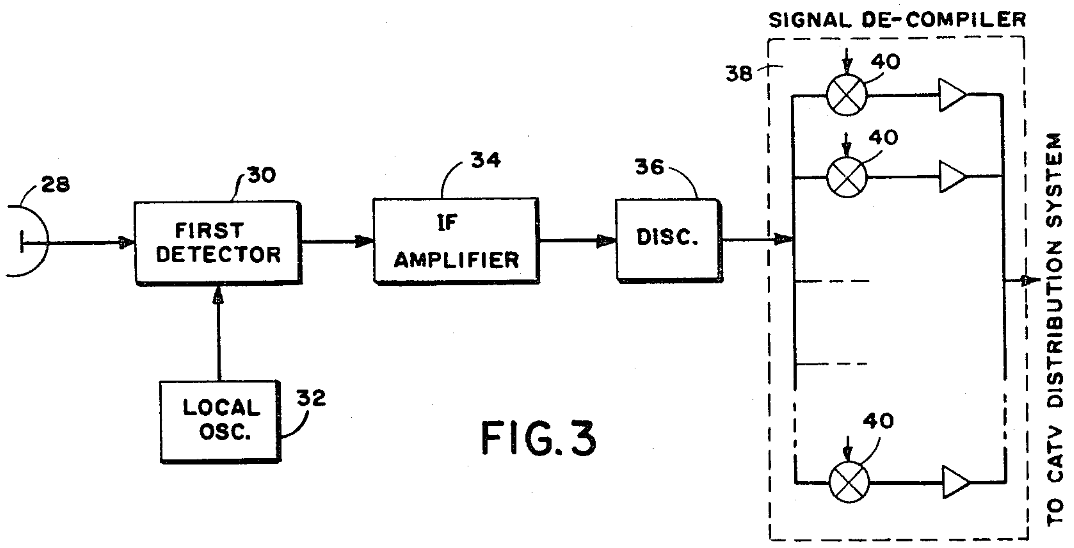
FIG. 3 is a schematic block diagram of a receiver for operation with the transmitter of FIG. 1.

FIG. 3 illustrates a receiver which can be used to advantage to receive signals from the transmitter of FIG. 1. The signals from the transmitter are picked up at a receiving antenna 28 and are then applied to the input of a detector 30 which also receives a signal from a receiver local oscillator 32. Those signals are mixed in detector 30 to produce at its output the receiver intermediate frequency signal at 750MHz. The latter may either be obtained by mixing the received signal with the local oscillator at a frequency 18GHz. if the transmitted signal is sent as a single side band suppressed carrier, or by a conventional AM detection scheme, if the transmitted signal is sent double (or single) sideband with the carrier. In either event, the first detector output is a frequency modulated wave whose average envelope frequency is centered about 750MHz. That signal is applied to an IF amplifier 34 where it is amplified and limited in a known manner, after which it is applied to the input of a discriminator 36 to detect the FM modulated composite video signal.

The frequency demodulated output of discriminator 36 is thus the multiplexed television signal formed in signal compiler 10 of the transmitter of FIG. 1. That signal is applied to the input of a signal compiler 38 which functions substantially in opposite sequence to signal compiler 10 of the transmitter, in that the composite demodulated signal is separated into its component video signals and the signals are processed by means of frequency translators 40 to retranslate these signals to their required locations in the television channel allocations for subsequent transmission over a cable distribution system or other conventional television distribution and transmission system.

Figure 4:
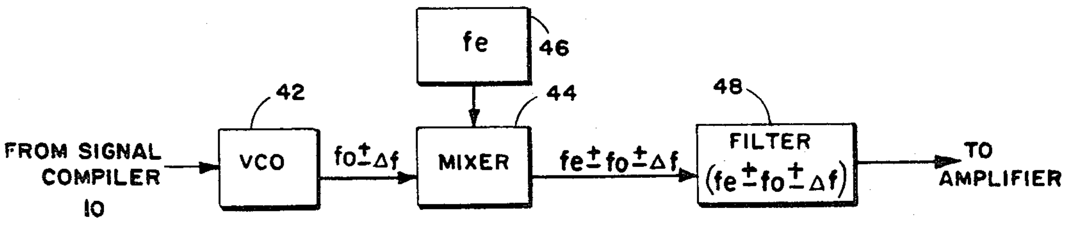
FIG. 4 is a partial schematic block diagram of a modification of the transmitter of FIG. 1

FIG. 4 illustrates schematically a variation in the transmitter of FIG. 1 in which one of the sidebands and the carrier is suppressed leaving only a single sideband for transmission to the receiver. As shown, the composite modulating signal from signal compiler 10 is applied to a voltage-controlled oscillator 42 having a nominal frequency of *fo*, the output of which is applied to a mixer 44. Mixer 44 also receives a high frequency signal at a frequency *fe* from a high-frequency carrier source 46. The output of mixer 46 is the sum and difference of its two input signals, that is $fe \pm fo \pm \Delta f$, where $\Delta f$ is the modulating signal produced by the composite video signal input to oscillator 44. The output of mixer 44 is applied to the input of a band-pass filter 48 which passes only one of the sidebands produced in mixer 44, to wit, $fe + fo \pm \Delta f$, and therefore suppresses the carrier and the other sideband. The output of filter 48 is coupled to an amplifier and antenna (not shown) for transmission to the receiver as before.

FIGS. 5*a* and 5*b*, respectively, illustrate a transmitter and its associated receiver in accord with a further embodiment of the present invention in which, as in the FIG. 4 embodiment, only a single sideband is transmitted. In the transmitter of FIG. 5*a* the modulated composite signal produced by signal compiler 10 is applied to the control terminal of a voltage controlled oscillator 50 at a nominal frequency of *fo* which produces a modulated carrier $fo \pm \Delta f$ at its output which, in turn, is applied to a switch pulser 52 which may be similar to modulator 20 of the transmitter of FIG. 1. Also applied to switch pulser 52 is a carrier signal at a frequency *fe* produced by a high-frequency oscillator 54. That carrier is pulse width modulated in response to the modulating signal derived from oscillator 50 to produce a pulse width modulated signal at the output of switch pulser 52, which in turn is applied to the input of a band-pass filter 56. Filter 56 operates in the same manner as filter 48 in the embodiment of FIG. 4 to suppress the carrier and one of the sidebands produced at the output of pulser 52. The suppressed carrier output signal is applied to a traveling wave tube amplifier 34 which amplifies and filters the sideband signal and couples it to transmitting antenna 26.

The associated receiver for this transmitter as illustrated in FIG. 5*b*, receives the suppressed carrier single sideband signal at receiving antenna 28 and applies that signal to the input of a mixer 58 where the received signal is mixed with a local oscillator signal at a frequency *fe* produced by a local oscillator 60 to produce a signal at a carrier frequency *fo* modulated in accord with the composite video signal $\Delta f$. The output of mixer 58 is amplified in an RF amplifier 62 after which it is applied to the input of a discriminator 64. The remainder of the receiver is similar to the one illustrated in FIG. 3 in that the output of discriminator 64 is applied to a signal decompiler such as that shown at 38 in the receiver of FIG. 3 where the video signals are separated and frequency translated for subsequent retransmission.

The embodiment of the invention illustrated in FIGS. 6*a* and 62 is one in which only one side band is suppressed and the carrier plus the other side band is transmitted, thereby reducing the complexity of the receiver. In the transmitter, the composite video signal output of signal compiler 10 is again used to modulate the output of a voltage controlled oscillator 66 at a frequency *fo* to produce a frequency modulated output signal $fo \pm \Delta f$ which in turn is applied to the input of a mixer 68. Mixer 68 also receives a signal at a frequency *fx* from a carrier source 70 which frequency is close to the nominal frequency *fo* of oscillator 66. The output of mixer 68 thus contains all the modulating information of the input video signals, but is at a reduced bandwidth since its center frequency may be low, in the order of 100 Hz. The output of mixer 68, which is indicated as $100+\Delta f$ is applied to the input of a switch pulser or modulator 71 which also receives a high-frequency carrier signal at a frequency *fe* from an oscillator 72. That signal is modulated and applied to the input of a band-pass filter 74 which passes the carrier signal and one side band to the transmitter antenna for transmission to the receiver illustrated in FIG. 6*a*.

That receiver comprises a receiving antenna 28, the output of which is coupled to an RF amplifier 76 tuned to amplify at a frequency *fe*. The output of amplifier 76 is applied to the input of a detector 78 in which the carrier *fe* is removed and the FM signal $\Delta f$ is applied to an amplifier 80 and then to discriminator 82. The output of discriminator 82 is then applied as before to a signal decompiler which separates the component video signals for retransmission. Thus, the increased complexity of the transmitter of FIG. 6*a* permits the use of the simplified receiver of FIG. 6*b*, which may be desirable in situations in which a single transmitter is operating in a system utilizing a plurality of receivers.

FIGS. 7 and 8 illustrate in more detailed form a typical system in which the signal compiler is used to combine independently derived video signals which may be received at the transmitter by one or more antennas. Those signals include the normally used commercial channels 2 –13 as well as locally generated signals which can be combined with the commercial TV signals. Thus, in the transmitter shown in FIG. 7, the commercial channels 2–13 are respectively applied to a series of audio notch filters 84–108 which reduce the level of the carriers by approximately 14 to 15 db. The locally originated channels A and B are respectively applied to the inputs of band-pass filters 110 and 112 to restrict their bandwidth to the available 6 MHz. channel bandwidth. Each of these carriers along with their associated sound, color and video content is amplified in a signal channel amplifier 112–136 connected to the outputs of the audio notch filters and band pass filters, respectively, the gains of the individual amplifiers being established such that the outputs of all the amplifiers are substantially equal.

The outputs from amplifiers 112 and 116 are combined in a combiner 138, the outputs of amplifiers 116 and 118 are combined in a combiner 140, and the outputs of amplifiers 120 and 122 are combined in a combiner 142. The outputs of amplifiers 126 and 128 are combined in combiner 144, the outputs of amplifiers 130 and 132 are combined in a combiner 146, and the outputs of amplifiers 133 and 134 are combined in a combiner 148. The outputs of combiners 138 and 140 are in turn combined in a combiner 150 and the outputs of amplifier 124 are combined in a combiner 152. Similarly, the outputs of combiners 144 and 146 are combined in a combiner 156. A third set of television signals occupying the channels lying between 98 and 140 Mhz. is applied to a combiner 158.

The outputs of combiners 150 and 152 are in turn combined in a combiner 160 while the outputs of combiners 154 and 156 along with a carrier at 224 Mhz. derived from a local oscillator 162 are applied to a combiner mixer 146 in which the signals lying in the higher channels 7–13 are translated into channels lying between 8 and 50 MHz. The outputs of combiners 158 and 160 and combiner-mixer 114 define the composite video modulating signal for the transmitter and are all applied to a modulator generally designated 166 which may include the variable oscillator 18 and pulse width modulator 20 of the FIG. 1 embodiment.

As in the transmitter of FIG. 1, the carrier signal is derived from a carrier source 168 which carrier is pulse-width modulated as described above, after which the modulated signal is amplified and filtered at TWT amplifier 170. The modulated signal carrier containing a plurality of video signals is transmitted to the receiver by antenna 172.

That receiver, as illustrated in FIG. 8, comprises an antenna 174 which receives the multiple video signal modulated signal and applies that signal to a detector 176. The signal is there mixed with a local oscillator (not shown) to produce the FM intermediate frequency signal which is amplified at amplifier 178 after which it is applied to a demodulator 180 which may conveniently be a discriminator. The output of demodulator 180 is applied to the input of a passive frequency sensitive filter 182 where the signals are divided into three components lying within three frequency bands. The first of these signals lying in the 98–140 MHz. band is coupled to an amplifier 184, the second lying in the 54–94 MHz. band is coupled to an amplifier 186, and the third lying in the previously translated 8–50 Mhz. band is coupled to an amplifier mixer 188. The latter also receives a signal at 224 MHz. produced at a local oscillator 190 to return those signals to their original frequencies lying in the 174–216MHz. band.

The outputs of amplifiers 184-188 are all applied to a combiner-amplifier 192, where the television signals are combined and then applied to a distribution system generally designated 194 which may, as in the receiver of FIG. 3, include the signal decompiler or demultiplexer in which the television signals are separated for transmission over a cable television system, CATV system, or the like.

The communication system of the present invention thus provides means for broadcasting or transmitting a plurality of television signals or the like over a single transmitter and thereby enables the transmission of these signals in a far more economical and simple manner than has heretofore been possible by the known systems of this type. The system of the invention enables the more efficient use of the available bandwidth to transmit educational and commercial television signals or any other prospective uses of the bandwidth above 10 MHz., thereby greatly expanding the potential uses of television.

Moreover, the system of the invention provides an improved signal-to-noise ratio over that obtained from a comparable AM system at the bandwidths required for most practical applications. The system of the invention enables the use of longer point-to-point transmissions or the use of multiple hop systems. In addition, since the video signal processing takes place at relatively low levels and generates the higher level signal in stages not requiring linearity, the output stages can be operated at maximum power outputs and thus at maximum efficiency.

While several embodiments of the present invention have been specifically described, it will be apparent that modifications may be therein without departing from the spirit and scope of the invention.

We claim:

1. A communications system comprising means for combining a plurality of input information signals into a single input modulating signal, first modulating means coupled to said signal combining means for producing a frequency modulated signal corresponding to said modulating signal, a source of an RF carrier signal, and second modulating means coupled to said carrier signal source and to said first modulating means for pulse-width modulating said carrier signal with said frequency modulated signal, such that the output of said second modulating means comprises a series of RF pulses having pulse widths corresponding to the frequency deviations of said frequency modulated signal.

2. The communications system of claim 1, in which said information signals include a plurality of video signals, said combining means comprising means for summing and translating said video signals into a plurality of sideband channels separated by a predetermined frequency.

3. The communications system of claim 2, further comprising filter means coupled to the output of said second modulating means for suppressing one sideband of the output signal of said second modulating means.

4. The communications system of claim 3, in which said filter means further comprises means for suppressing said carrier frequency.

5. The communications system of claim 4, in which said second modulating means comprises pulse width modulating means for periodically switching on and off said carrier in response to said modulating signal.

6. The communications system of claim 1, in which said second modulating means comprises means for forming the sum of said modulating signal and said carrier.

7. The communications system of claim 1, in which said first modulating means comprises variable oscillator means having an output frequency determined by the instantaneous level of said modulating signal.

8. The communications system of claim 7, in which said second modulating means comprises pulse width modulating means for periodically switching on and off said carrier in response to said modulating signal.

9. The system of claim 8, further comprising amplifying and filtering means coupled to the output of said second modulating means.

10. The communications system of claim 1, further comprising filter means coupled to the output of said second modulating means for suppressing said carrier frequency.

* * * * *